H. Boyle.
Turbine Water Wheel.
№ 98,913. Patented Jan. 18, 1870.
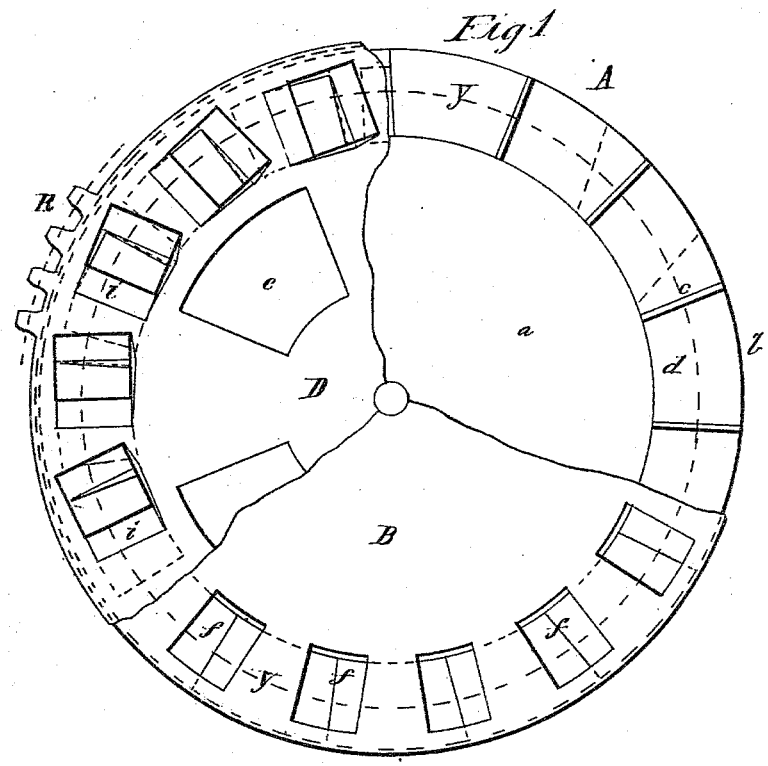
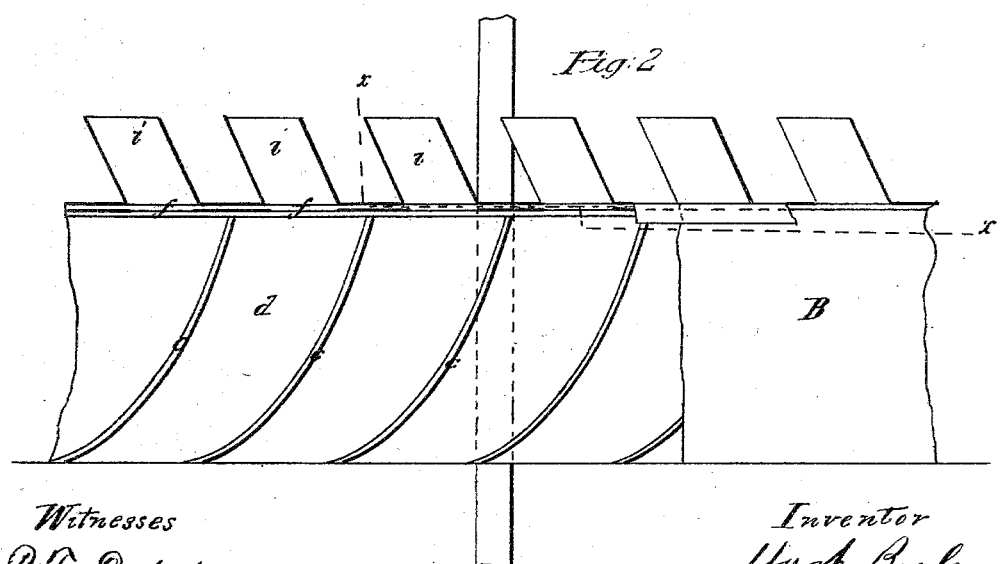
Witnesses
P. T. Dodge
L. Hailer
Inventor
Hugh Boyle
by Dodge & Munn
his atty's

United States Patent Office.

HUGH BOYLE, OF WATERLOO, IOWA.

Letters Patent No. 98,913, dated January 18, 1870.

---

IMPROVEMENT IN TURBINE WATER-WHEELS.

---

The Schedule referred to in these Letters Patent and making part of the same.

---

*To all whom it may concern:*

Be it known that I, HUGH BOYLE, of Waterloo, in the county of Blackhawk, and State of Iowa, have invented certain new and useful Improvements in Water-Wheels; and I do hereby declare that the following is a full, clear, and exact description thereof, reference being had to the accompanying drawings, making part of this specification, and to the letters of reference marked thereon.

Like letters indicate like parts wherever they occur.

To enable others skilled in the art to construct and use my invention, I will proceed to describe it.

My invention relates to turbine water-wheels, and consists in a novel construction and arrangement of the wheel with its casing, in connection with a peculiarly-constructed cap, provided with a series of inclined chutes.

In the drawings—

Figure 1 is a top plan view, with portions broken away on the line $x\ x$ of fig. 2; and Figure 2 is a view of my wheel, developed or straightened out on the red line of fig. 1.

In constructing my wheel A, I make two concentric cylinders, $b$ and $d$, and arrange securely between them, at equal distances from each other, a series of partitions, $c$, curved or inclined, as clearly shown in fig. 2, and in this way divide up the space between the cylinders into a series of buckets.

The upper end of the inner cylinder, I cover with a strong plate or cap, $a$, securely attached, and, in its centre, place the vertical shaft C, connecting it securely to it in any suitable manner.

The wheel, thus constructed, I mount in a cylindrical case, B, having a step in its lower end to receive the shaft C, in such a manner as to support the wheel, and allow it to turn freely in the bearing, and also having its upper end slightly convex, and provided, near its periphery, with a series of openings, $f$, corresponding in number with the buckets formed by the partitions $c$, and in shape with their upper ends, as clearly shown in figs. 1 and 2.

On top of this casing B, I place a plate, D, constructed with a series of holes, corresponding in number and size with the openings $f$ in the casing, and to each one of them attach a flue or chute, $i$, rising a short distance above the plate, and inclining in the opposite direction from the partitions $c$, and also provide it with large openings $e$, all as clearly shown in the figures.

The shaft C, to which the wheel is attached, projects through the top of the casing, and also through the plate D, in both of which it turns freely.

The plate D is provided on one side with a rack, $n$, so that it may be operated by any suitable device or mechanism, and its openings and chutes $i$ are so arranged that they may at any time be wholly or partially opened, or placed in line with the buckets of the wheel.

My wheel, thus mounted in its casing, and provided with the plate having the inclined chutes, I set in any place suitable for its operation.

To operate it, I let on the water in the usual way; then turn the plate D, so as to allow the water to run through the inclines $i$ and openings $f$, and strike against the partitions $c$, which, being curved and inclined in the opposite direction, will be driven forward both by the direct action of the water impinging against them as it enters, and by its reaction in pressing upon and flowing from them.

The speed of the wheel may be regulated by turning the plate D, so that the chutes $i$ may admit more or less water to flow through, as desired, or a governor may be connected with the wheel, so as to regulate the supply of water, and, in this way, its speed.

The openings $e$, in the plate D, relieve it from the pressure of the water, so that it can be turned with more ease than it could if it were without these openings.

A wheel thus constructed is strong, durable, and efficient.

Having thus described my invention,

What I claim, is—

1. A turbine water-wheel, consisting of the wheel A, having its two concentric cylinders connected by curved inclined partitions $c$, the casing B, with openings $f$ and plate D, provided with the inclined chutes $i$, all constructed and arranged with the shaft C, substantially as herein described.

2. The plate D, provided with the inclined chutes $i$, in combination with a vertical discharge-wheel, A, when constructed and arranged to operate substantially as herein described.

HUGH BOYLE.

Witnesses:
 WM. H. LOTZ,
 A. LIMBENE.